Dec. 23, 1969     K. H. SENNOWITZ     3,485,988

ELECTRICAL DISCHARGE MACHINING POWER SUPPLY CIRCUIT

Filed March 28, 1967

INVENTOR.
Kurt H. Sennowitz
BY
Harry R. Dumont
ATTORNEY

United States Patent Office 3,485,988
Patented Dec. 23, 1969

3,485,988
ELECTRICAL DISCHARGE MACHINING POWER SUPPLY CIRCUIT
Kurt H. Sennowitz, Royal Oak, Mich., assignor, by mesne assignments, to Elox Inc., Troy, Mich., a corporation of Delaware
Filed Mar. 28, 1967, Ser. No. 626,552
Int. Cl. B23k 9/16
U.S. Cl. 219—69    8 Claims

ABSTRACT OF THE DISCLOSURE

An EDM circuit having a principal DC power source of gap-firing voltage connected across the working gap. Periodic turn-off pulses are imposed across the gap by an isolating transformer whose secondary is connected across the gap in series with a rectifier and a capacitor.

Background of the invention

The field to which my invention relates is that known as electrical discharge machining in which material is removed from an electrically conductive workpiece by the action of electrical gap discharges between a tool electrode and the workpiece. An electrode servo feed system is employed to maintain an optimum gap spacing between electrode and workpiece as metal removal progresses. A dielectric coolant is circulated continuously through the gap during machining operation.

I have found that for low electrode wear machining, which may be achieved with certain electrode materials, it is required that high current, relatively long on-time pulses be employed in connection with a gap polarity whereby the electrode is positive and the workpiece negative.

Summary of the invention

My invention provides for the use of a pulsed, semi-conductor controlled rectifier connected through a transformer across the machining gap to provide short duration power supply turn-off spikes by periodically turning off the gap responsive to switching of the controlled rectifier. A pulse forming network is included in series with the transformer for percise control of pulse frequency and on-time and to provide a machining pulse of desired sharp rise and fall characteristic. The pulse forming network additionally provides turn-off for the controlled rectifier.

Description

Figure 1:
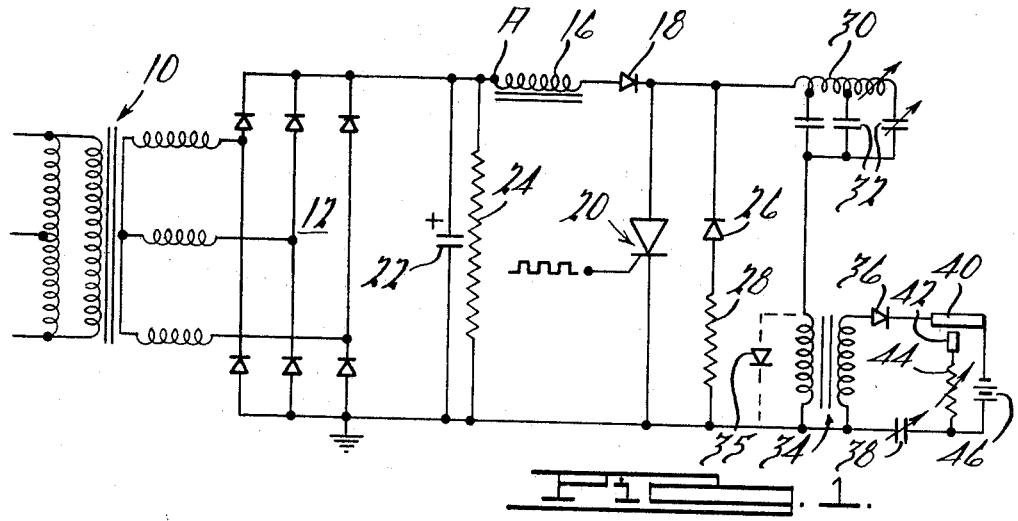
FIGURE 1 is a schematic of a preferred form of my invention.

Referring to FIGURE 1, a power source for the pulse generator is provided by AC transformer 10 and full-wave rectifier 12. A series charging inductor 16 and a hold-off diode 18 are connected between the positive terminal of the power source and the anode of a semiconductor controlled rectifier 20. A filter capacitor 22 and bleeder resistor 24 are each connected across the output of rectifier 12. An inverse diode 26 and resistor 28 are connected in series across the anode and cathode of controlled rectifier 20 to protect it from over-voltage spikes. A pulse forming network including inductor 30 and capacitors 32 is connected in series with the primary of transformer 34 across the principal electrodes of controlled rectifier 20. A clipping diode 35 may also be connected across the primary of transformer 34 if desired.

The output stage of the circuit includes the secondary of transformer 34 connected in series combination with a diode 36 and a capacitor 38. This series combination is connected across the machining gap comprising workpiece 40 and electrode 42. A power supply 46 is connected across the gap through a machining current control resistor 44. A source of triggering pulses is connected to the gate electrode of controlled rectifier 20 for periodically triggering it on. The triggering pulses are of positive polarity and may be furnished by the output of an astable multivibrator, relaxation oscillator or like circuits well known in the electronic arts. An example of a suitable multivibrator is shown in FIGURE 1 of my copending U.S. application No. 531,856, filed on Mar. 4, 1966, and entitled "Electrical Discharge Machining Power Supply." While my invention is related to the use of semiconductor controlled rectifiers as an electronic switching means, it is not so limited. Other electronic triggering devices may be employed. By "electronic triggering device" I mean an electronic switch having at least two principal electrodes and a gate electrode. The device is triggered into its conductive state by an appropriate polarity pulse applied to its gate electrode. The device is subsequently turned off by a temporary interruption or reversal of polarity across the principal electrodes.

In the circuit of FIGURE 1, capacitors 32 of the pulse forming network are initially charged up to slightly less than twice the voltage of the power source through charging inductor 16 and diode 18. Diode 18 functions as a hold-off diode to maintain the voltage charge on capacitors 32 until controlled rectifier 20 is triggered on by a positive-going pulse at its gate. Discharge of the capacitors then takes place through controlled rectifier 20. The current through controlled rectifier 20 is reduced below its holding current level and it is turned off. The pulse forming network for high power switching has a low impedance. At the same time controlled rectifier is being turned off, a current pulse is passed through transformer 34 to provide a turn-off pulse from its secondary to turn off the gap. The value of inductor 30 is made adjustable for the correct delay time and at least one capacitor 32 is made adjustable to give the desired turn-off pulse width. This mode of operation insures that DC source 46 is periodically turned off with long on-time pulses being provided to the machining gap. The use of a pulse forming network makes possible resultant square wave machining pulses across the gap. In addition, the pulse forming network makes turn-off operation available for controlled rectifier 20 without the need for a second controlled rectifier and commutating capacitor. With the circuit of FIGURE 1, it is possible to provide machining pulses of as high as 95% on-time, which condition is important to electrode low-wear or no-wear operation. Where the DC source 46 is of relatively high magnitude, diode 36 may be removed from the circuit to provide a large reverse voltage pulse to insure its turn-off.

Figure 2:
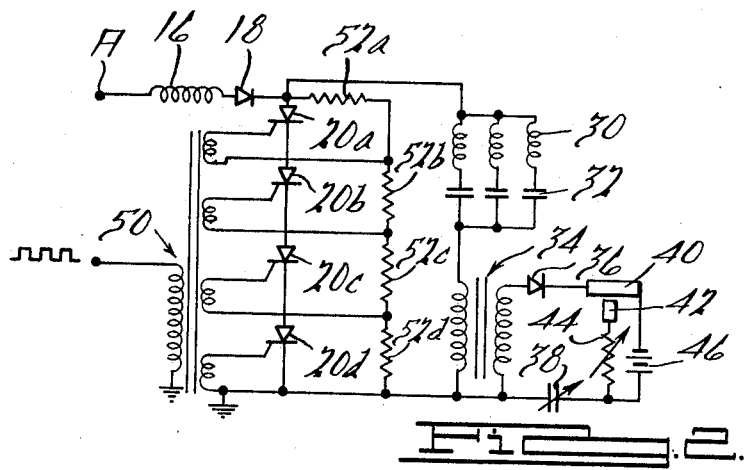
FIGURES 2 and 3 are schematics of alternate forms of my invention.

FIGURE 2 shows a circuit with a plurality of controlled rectifiers 20a–20d series connected for higher voltage operation. Equalizing shunt resistors 52a–52d are connected as shown to prevent unequal voltage division across the controlled rectifiers. Inductor 16 is coupled between a teminal of a power supply like that shown in FIGURE 1 and the anode of controlled rectifier 20a. Triggering-on is accomplished through a transformer 50 in which the positive going trigger pulses are applied to its primary and passed through a plurality of secondaries to the respective controlled rectifier gate electrodes. Controlled rectifiers 20a–20d are thus simultaneously triggered on. It is possible to provide much greater power output per pulse with this type of circuit.

Figure 3:
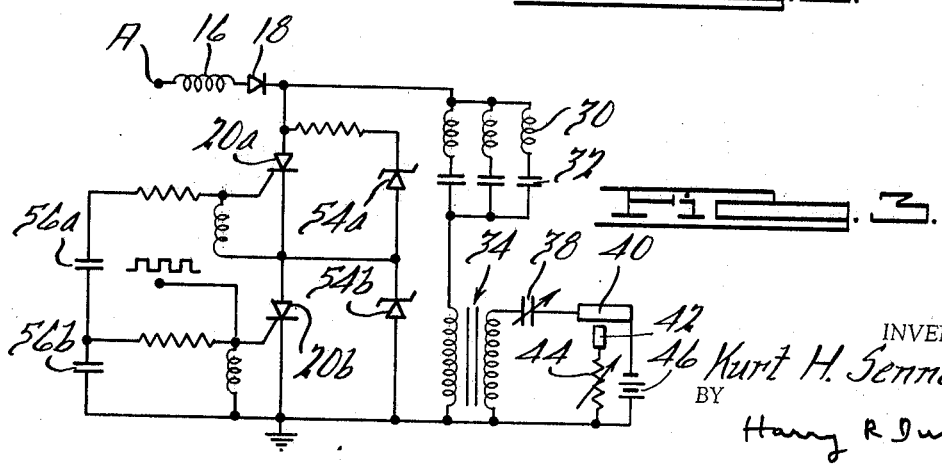

FIGURE 3 shows a circuit adapted for high voltage operation with a somewhat different triggering arrangement. Controlled rectifiers 20a and 20b are series connected with shunt protective Zener diodes 54a, 54b connected as shown. This circuit provides for a trigger pulse to be applied to the gate of controlled rectifier 20b. As soon as it is triggered on, capacitors 56a and 56b will charge and the upper plate of capacitor will be charged positive to trigger controlled rectifier 20a into conduction. Turn-off will be accomplished in the manner described in connection with FIGURE 1. Long on-time gap machining pulses are thus provided by the sharp turn-off of the gap provided through transformer 34.

It will thus be seen that I have provided a novel and improved power supply circuit for electrical discharge machining.

I claim:

1. In an electrical discharge machining apparatus for machining a conductive workpiece by a tool electrode across a dielectric coolant filled gap, a machining power circuit including a first power supply connected across said gap wherein the improvement comprises an electronic triggering means having a gate electrode and a pair of principal electrodes, a second power supply, said second power supply connected in series with an inductor and a diode across said principal electrodes of said triggering means, a capacitor-inductor pulse forming network, a transformer having a primary and a secondary winding, said primary winding and said network connected in series across said principal electrodes, said secondary connected in series with a capacitor across said gap, and pulsing means connected to said gating electrode for periodically turning said controlled rectifier on whereby said gap voltage is reduced to turn it off.

2. In an electrical discharge machining apparatus for machining a conductive workpiece by a tool electrode across a dielectrc coolant filled gap, a machining power circuit including a DC power supply connected across said gap wherein the improvement comprises an electronic triggering means having a gate electrode and a pair of principal electrodes, a second power supply operatively connected across said principal electrodes, an inductor-capacitor pulse forming network, a transformer having a primary and a secondary winding, said network connected in series with said primary winding across said principal electrodes, said secondary winding connected in series with a diode and a capacitor across said gap, and pulsing means connected to said gating electrode for periodically turning said controlled rectifier on whereby said gap voltage is reduced to turn it off.

3. In an electrical discharge machining apparatus for machining a conductive workpiece by a tool electrode across a dielectric coolant filled gap, a machining power circuit including a first power supply connected across said gap wherein the improvement comprises a second power supply, a controlled rectifier having a gate electrode and a pair of principal electrodes, a transformer having a primary and a secondary winding, said principal electrodes connected across said second source, an inductor-capacitor pulse forming network connected in series with said primary across said principal electrodes, said secondary operatively connected across said gap for short period turn-off of said gap.

4. The combination as set forth in claim 3 wherein an inductor and a hold-off diode are connected in series between said second power supply and one principal electrode of said controlled rectifier to insure its turn-off.

5. The combination as set forth in claim 3 wherein said secondary winding is connected in series with a capacitor across said gap.

6. In an electrical discharge machining apparatus for machining a conductive workpiece by a tool electrode across a dielectric coolant filled gap, a machining power circuit including a first power supply connected across said gap wherein the improvement comprises a second power supply, a plurality of like phased controlled rectifiers having their principal electrodes connected in a series string, a transformer having a primary and a secondary winding, a capacitor-inductor pulse forming network connected in series with said primary winding across said series string, said secondary winding operatively connected across said gap to provide spaced short duration turn-off pulses thereto, and means operatively connected to the gate electrodes of said controlled rectifiers for triggering them into conduction at the same time.

7. The combination as set forth in claim 6 wherein said last-mentioned means comprises a pulse transformer having a primary winding adapted to receive triggering pulses and a plurality of secondary windings, each connected to a different one of said gate electrodes.

8. In an electrical discharge machining apparatus for machining a conductive workpiece by a tool electrode across a dielectric coolant filled gap, a machining power circuit including a first power supply connected across said gap wherein the improvement comprises a second power supply, a pair of controlled rectifiers each having a gate electrode and a pair of principal electrodes, said principal electrodes connected in series across said second power supply, a pair of capacitors, each connected across the gate and a like principal electrode of a different one of said controlled rectifiers, said capacitors connected in series, a pulsing means operatively connected to one of said gates for turning the associated controlled rectifier on and subsequently charging said capacitors to a polarity for turning the other controlled rectifier on, a transformer having a primary and a secondary winding, said secondary winding operatively connected across said gap, a pulse forming network connected in series combination with said primary winding, said series combination connected across said principal electrodes of both said controlled rectifiers, said network operable to turn said controlled rectifiers off subsequent to their turn-on and operable to provide through said secondary winding a short duration turn-off pulse to said gap and said first power supply.

References Cited

UNITED STATES PATENTS

| | | |
|---|---|---|
| 2,876,386 | 3/1959 | Fefer et al. |
| 3,056,065 | 9/1962 | Porterfield. |
| 3,158,728 | 11/1964 | Webb. |

JOSEPH V. TRUHE, Primary Examiner

R. F. STAUBLY, Assistant Examiner